E. O. OLSEN.
EXPANSION VALVE FOR REFRIGERATING APPARATUS.
APPLICATION FILED DEC. 26, 1917.
1,286,397. Patented Dec. 3, 1918.
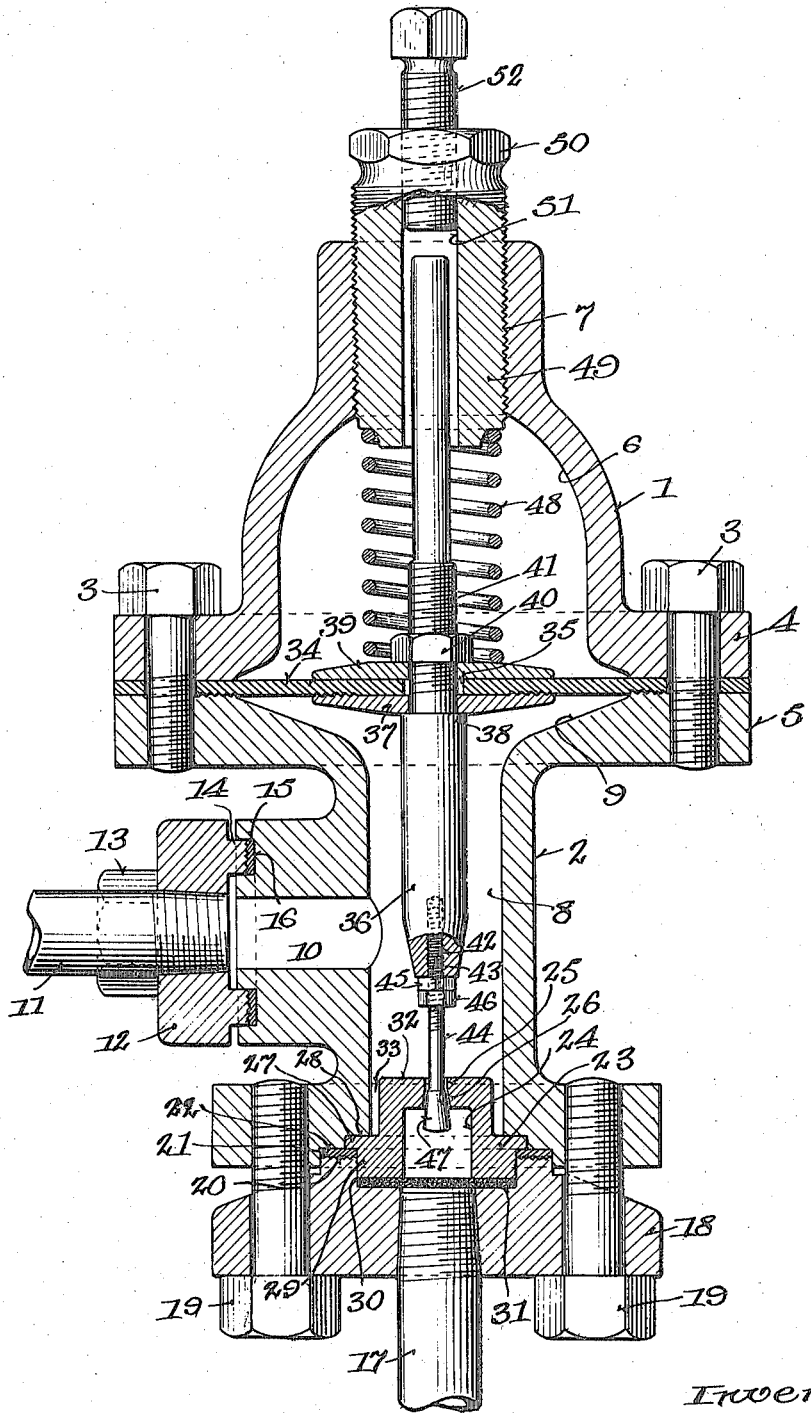
Inventor
Edwin O. Olsen
By Monell, Keeney & French
Attorneys.

UNITED STATES PATENT OFFICE.

EDWIN O. OLSEN, OF MILWAUKEE, WISCONSIN, ASSIGNOR OF ONE-FOURTH TO FREDERICH MARGGRAFF, ONE-FOURTH TO ARTHUR MARGGRAFF, AND ONE-FOURTH TO HARVEY MARGGRAFF, ALL OF MILWAUKEE, WISCONSIN.

EXPANSION-VALVE FOR REFRIGERATING APPARATUS.

1,286,397.          Specification of Letters Patent.          Patented Dec. 3, 1918.

Application filed December 26, 1917. Serial No. 208,847.

*To all whom it may concern:*

Be it known that I, EDWIN O. OLSEN, a citizen of the United States, and resident of Milwaukee, in the county of Milwaukee and State of Wisconsin, have invented new and useful Improvements in Expansion-Valves for Refrigerating Apparatus, of which the following is a description, reference being had to the accompanying drawings, which are a part of this specification.

The invention relates to expansion valves for refrigerating apparatus.

In refrigerating apparatus as is well known expansion valves are used to control the flow of the refrigerant from the high pressure side of the apparatus to the low pressure side and this invention consists in the simple construction, combination and arrangement of the parts of the valve as will be more particularly hereinafter described.

Another object of the invention is to provide means for adjusting the pressure under which the expansion valve is operated.

A further feature of the invention is the provision of means for releasing the valve should it for any reason become clogged or held to its seat.

These objects and others I secure as hereinafter set forth, reference being had to the accompanying drawing which shows a vertical cross sectional view through the device embodying the invention.

The casing for the valve is composed of two parts 1 and 2 secured together by bolts 3 passing through annular flanges 4 and 5 on said parts. The part 1 has a hollow interior 6 with a threaded bore 7 communicating with one end thereof. The part 2 has a conduit 8 therein having a flared upper end 9 and an outlet conduit 10 communicating with the conduit 8.

The refrigerant to the low pressure side of the apparatus is conducted through the conduit 10 to a pipe 11 which is secured at its end in a cap 12 secured to the part 2 adjacent the conduit 10 by bolts 13 (only one being shown) said cap being tightly fitted on the part 2 by an annular rib 14 and packing ring 15 seated in an annular groove 16 in the part 2.

The refrigerant is conducted from the high pressure side of the apparatus through a pipe 17 secured at its end in a cap 18 secured to the lower end of the part 2 by bolts 19 and provided with an annular rib 20 and packing ring 21 seated in an annular recess 22 adjacent the lower end of the conduit 8.

Mounted within the lower end of the conduit 8 and secured between the cap 18 and the lower end of the part 2 is a valve member 23 having a bore 24 therein communicating with the pipe 17 at one end and with a valve opening 25 of small area at the other end, said opening having a conical lower end 26 to form a valve seat. The member 23 has an annular flange 27 disposed in an annular recess 28 in the lower end of the part 2 adjacent the packing ring 21 and a cylindrical portion 29 seated in a cylindrical recess 30 in the cap 18. A strainer 31 is seated in the recess 30 between the cap 18 and the valve member and over the end of the pipe 17 to prevent foreign matter passing from the bore 24 into the pipe 17. The upper portion 32 of the valve member 23 projects into the end of the conduit 8 and is spaced therefrom to form an annular channel 33.

Mounted and clamped by the bolts 3 between the flanges 4 and 5 of the parts 1 and 2 is a diaphragm 34 of rubber or other suitable material having a central opening 35. A valve rod 36 extends through said opening and is clamped directly to the diaphragm by an annular ring 37 seated on a shouldered portion 38 of the rod and an annular ring 39, said rings being held in clamping engagement with the diaphragm by a nut 40 mounted on a threaded portion 41 of said rod. With this construction the movement of the diaphragm will directly impart a movement to the rod.

The lower end of the rod 36 is provided with a threaded aperture 42 and the threaded end 43 of a valve stem 44 is adjustably secured therein by means of a nut 45 and lock nut 46, whereby the position of the valve head may be set so that under normal conditions the diaphragm will be properly positioned. The lower end of the valve stem 44 moves in the opening 25 and is provided with a conical or tapered valve head 47 adapted to seat against the seat 26 when the valve stem and rod are moved upwardly by the pressure of the refrigerant flowing into the casing through the conduit 8 and acting against the diaphragm.

In order that the valve may be closed at predetermined pressure a spring 48 is interposed between the ring 39 and a threaded member 49 mounted in the threaded bore 7 of the part 1 and provided with a wrench engaging portion 50 and a bore 51 in which the upper end of the rod 36 is freely movable. With this construction the pressure at which the valve will shut is adjusted by screwing the member 49 from the outside of the casing the proper distance into the part 2 to compress the spring 48.

If for any reason the valve stem 44 should become lodged against its seat or the opening 25 should become clogged the valve rod 36 together with the stem is adapted to be moved downwardly to open the valve by means of threaded screw 52 mounted in a threaded opening in the top of the member 49 and movable within the bore 51 into engagement with the top of the valve rod 36 to force the same downwardly.

With the construction above described the spring 48 is adjusted for the pressure at which the device is to operate and under normal conditions the refrigerant flows from the pipe 17 through the conduit 8, bore 24, opening 25 to the pipe 11. If the pressure of the refrigerant entering the device exceeds the pressure with which the spring is holding the valve open it acts against the diaphragm 34 and moves the valve rod 36 upwardly against the action of the spring 48 thereby moving the valve head 45 against its seat and shutting off the flow of refrigerant to the conduit 8 and on a decrease in pressure on the high pressure side of the device the pressure of the entering refrigerant is also decreased so that the spring 48 acts to move the diaphragm 34 and valve rod 36 downwardly to open the valve.

In connection with the foregoing description it will be noted that the device is of very simple construction and that the complicated system of levers usually employed to operate the valve have been dispensed with.

What I claim as my invention is:

1. In an expansion valve, the combination of a casing having an open end and stepped recesses adjacent thereto, a member fitting within said end and having an annular flange seated in one of said recesses and an outwardly projecting cylindrical portion, a cap secured to said casing and having a cylindrical recess in which said cylindrical portion is seated and having a flange seated in the other recess, packing interposed between said cap, member and casing, said member having an opening therein, a valve for closing said opening, and a spring pressed diaphragm within the casing for controlling said valve.

2. In an expansion valve, the combination of a casing having an open end and stepped recesses adjacent thereto, a member fitting within said end and having an annular flange seated in one of said recesses and an outwardly projecting cylindrical portion, a cap secured to said casing and having a cylindrical recess within which said cylindrical portion is seated, a strainer in said cylindrical recess and interposed between the cap and said member, a flange on said cap seated in the other recess in the casing, packing interposed between said cap, member and casing, said member having an opening therein, a valve for closing said opening, and a spring pressed diaphragm within the casing for controlling said valve.

In testimony whereof, I affix my signature.

EDWIN O. OLSEN.